United States Patent [19]

Okita et al.

[11] Patent Number: 4,710,825

[45] Date of Patent: Dec. 1, 1987

[54] DISC RECORDING SYSTEM WITH SPEED CONTROL

[75] Inventors: Masaya Okita, Yokohama; Masahiro Sawada, Kawasaki; Tadashi Ota, Tokyo, all of Japan

[73] Assignee: Nippon Kogaku K.K., Tokyo, Japan

[21] Appl. No.: 939,225

[22] Filed: Dec. 8, 1986

Related U.S. Application Data

[63] Continuation of Ser. No. 612,689, May 22, 1984, abandoned.

[30] Foreign Application Priority Data

May 26, 1983 [JP] Japan .................................. 58-93121
Jul. 14, 1983 [JP] Japan ................................ 58-126860
Jul. 14, 1983 [JP] Japan ................................ 58-126861

[51] Int. Cl.$^4$ ............................................. H04N 5/781
[52] U.S. Cl. ..................................... 358/342; 358/906; 358/909; 358/338; 360/35.1; 360/73; 318/318
[58] Field of Search ............... 358/335, 342, 337, 338, 358/906, 909; 360/35.1, 55, 73; 369/47; 318/314, 318, 594, 603, 608, 600

[56] References Cited

U.S. PATENT DOCUMENTS

3,959,819  5/1976  Kubo ....................................... 360/73
4,278,924  7/1981  Mawatari et al. ................. 360/70 X
4,507,690  3/1985  Azuma et al. ...................... 360/33.1
4,544,957 10/1985  Moriya ................................ 358/338

Primary Examiner—Robert L. Richardson
Attorney, Agent, or Firm—Michael N. Meller

[57] ABSTRACT

A system for recording information on an information recording disc such as a magnetic or optical disc. The recording system includes velocity control means for controlling the disc at a predetermined rotation velocity and synchronizing signal phase shifting means for shifting the phase of a synchronizing signal of a signal to be recorded. The system controls the rotation of the disc by the velocity control at the same velocity as the rotation velocity in the phase locked condition by the phase control in a very short period of time and during the recording of a signal the synchronizing signal of the signal is generated to conform with the rotational phase of the disc thereby producing the same condition as the phase locked condition.

17 Claims, 28 Drawing Figures

DISC RECORDING SYSTEM WITH SPEED CONTROL

BACKGROUND OF THE INVENTION

The present invention relates to a system for recording signals on a disc-type rotary recording medium (hereinafter simply referred to as a disc) such as a magnetic disc, optical disc or photoelectromagnetic disc.

With known systems of the type which records signals on a recording medium such as a magnetic disc while rotating the disc by a motor, a method of controlling the rotational phase of the motor in accordance with the phase of a reference clock signal has been used (the method is hereinafter referred to as a phase control). While this phase control is capable of controlling the rotation velocity of the motor with a high degree of accuracy as compared with a method of detecting the rotation velocity of the motor to effect the rotation control (this method is hereinafter referred to as a velocity control), it has the disadvantage of requiring a longer time from the start of the motor until the rotation velocity is stabilized (this is hereinafter referred to as a lock-in condition) than in the case of the velocity control.

Then, in the case of a disc rotation control device which can be used with a small electronic still picture camera incorporating a recording system using, for example, a magnetic disc, a method is conceivable in which the phase of an output from a rotational phase signal generator (hereinafter referred to as a PG) which generates one or a plurality of pulses for every rotation of the magnetic disc is compared with the phase of a vertical synchronizing signal of a video signal to be recorded on the magnetic disc and the rotation control or the phase control of the magnetic disc driving motor is effected so as to maintain the phase difference between the two signals at a predetermined value. Taking for example the case of a portable appliance such as an electronic still picture camera, a battery is incorporated as a portable power supply and the capacity of the battery is limited. Therefore, a consideration should preferably be given so that the rotation of the disc is started just before the recording of a signal and the rotation is stopped upon the completion of the recording, thereby reducing the power consumption due to the rotation of the disc as far as possible. The measures heretofore taken for this purpose include, for example, the method of starting the rotation of the disc through the half-depression of the shutter button or the like in response to the action for photo taking purposes. In the case of this type of electronic still picture camera, no video is recorded during the time interval from the start of the rotation of the disc until the lock-in condition is attained and therefore the time interval between the start and the lock-in condition must be decreased as far as possible.

Also, in the case of portable type disc signal recording apparatus represented by a small electronic still picture camera incorporating, for example, the above-mentioned magnetic disc recording system, differing from stationary apparatus such as floppy disc drive apparatus or video disc apparatus, an object to be shot is followed with the disc drive unit itself being held with the hand and therefore the disturbance torque applied to the motor varies considerably thus giving rise to the danger that the rotation of the disc will deviate from the lock-in condition. In this case, also, no video is recorded, as during starting and therefore it is necessary to reduce as far as possible the time required for effecting the locking-in again after the locking-out or deviation.

Also, if, in the case of the phase control of the motor, the velocity control is effected as an auxiliary loop, some temperature drift of the velocity control circuit is compensated for by the phase control and thus the controlled velocity is not affected by the temperature. However, in order to control the rotation velocity of the motor so that it is substantially equal to the post lock-in velocity without effecting the phase control, it is necessary to construct a velocity control system of such high accuracy that the system is not affected by the temperature, etc.

SUMMARY OF THE INVENTION

It is an object of the present invention to provide a system for controlling the rotation of a motor with a reduced time interval between the start and the locking-in of the motor.

It is another object of the invention to provide a motor rotation control system which is not subject to the effect of temperature, has a high degree of accuracy and is simple in construction.

To accomplish the above objects, technically the gist of the invention resides in that the rotation of a disc is controlled by the velocity control to control the velocity of the disc at the same rotation velocity in the lock-in condition in a very short period of time and during the recording of a signal its synchronizing signal is generated to conform with the rotational phase of the disc, thereby producing the same condition as the phase-locked condition. For example, in the case of a small electronic still picture camera incorporating a magnetic disc type recording system, only a picture signal for one field or frame is recorded on the magnetic disc by each shooting operation so that only during the recording is the velocity control effected to control the disc at the same rotation velocity as in the lock-in condition and during the recording of a still picture signal on the magnetic disc the vertical synchronizing signal of the still picture signal is generated in synchronism with the rotational phase of the disc, thus effecting the rotation control of the motor substantially only by the velocity control without effecting the timeconsuming phase control and thereby reducing the time interval between the start and the locking-in of the motor.

In accordance with the invention there is thus provided a motor rotation control system comprising first pulse generating means for generating a plurality of pulses for every revolution of a motor, second pulse generating means for generating pulses each having a linearly varying time duration at the expiration of a predetermined time after the positive-going or negativegoing transition of the pulse from the first pulse generating means, and sample and hold means for sampling and holding the output of the second pulse generating means at the expiration of a given time period (including zero) after the positivegoing or negativegoing transition of the pulse from the first pulse generating means whereby the difference between the output signal from the sample and hold means and a reference voltage is fed back to control the rotation velocity of the motor, and the velocity controlling reference voltage consists of a voltage obtained by sampling the second pulse after the expiration of a predetermined time, thereby cancelling any voltage drift due to temperature.

In accordance with an embodiment of the invention, the time interval between the time of generation of the pulse and the time of the sample and hold operation of the sample and hold means is zero.

Further, while, in this embodiment of the invention, the pulse having a linearly varying time duration consists of a sawtooth pulse, it is possible to use, for example, a trapezoidal pulse in place of the sawtooth pulse.

In accordance with the invention, a motor rotation control system of the type including phase control means for controlling the rotational base of a motor in accordance with the phase of a reference clock signal, further includes velocity control means operable independently of the phase control means during the starting of the motor and velocity detecting means for detecting the rotation velocity of the motor. During the motor starting period the velocity control means controls the rotation of the motor at the same rotation velocity as in the phase lock-in condition and the velocity detecting means detects the attainment of substantially the same rotation velocity as in the phase lock-in condition to generate a reference clock signal in synchronism with the rotational phase of the motor thereby reducing the time interval between the start and the phase locking-in of the motor.

The above and other objects as well as advantageous features of the invention will become more clear from the following description taken in conjunction with the drawings.

DETAILED DESCRIPTION OF THE PREFERRED EMBODIMENTS

Figure 1:
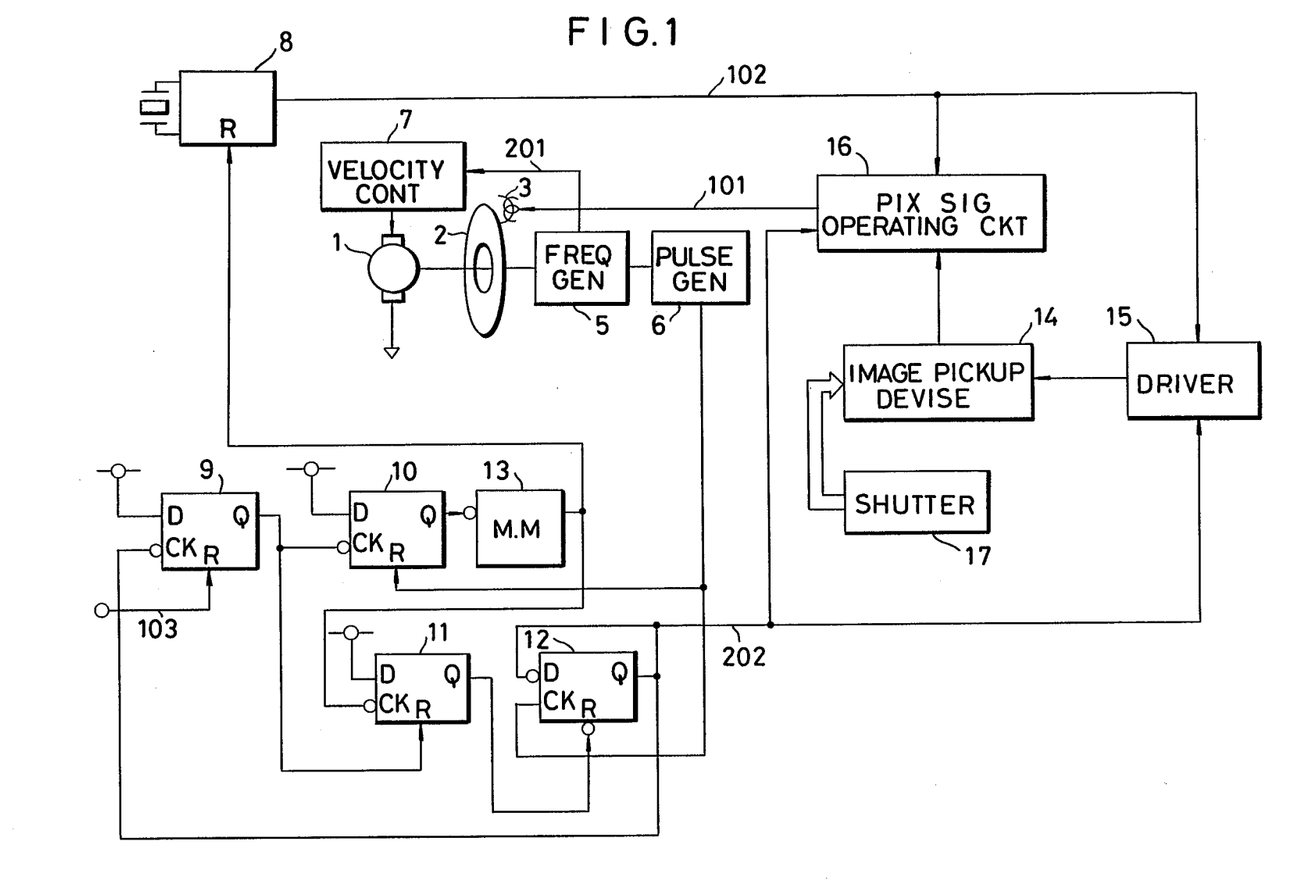
FIG. 1 is a block diagram showing an embodiment of the present invention.

Referring to FIG. 1 showing a block diagram of a system according to an embodiment of the present invention, the system includes a motor 1 for rotating a magnetic disc 2, a magnetic recording head 3 for recording picture signals on the disc 2, a frequency generator 5 (hereinafter simply referred to as an FG) for generating N pulses for every rotation of the magnetic disc 2, a rotational phase signal generator or PG 6 for generating a pulse for every rotation of the magnetic disc 2, a velocity control circuit 7 for controlling the rotation velocity of the motor 1 by controlling the voltage applied to the motor 1 so as to maintain the pulse spacing of the output from the FG 5 at a predetermined value, a synchronizing signal generator 8 for dividing the frequency of reference clocks signals from a crystal oscillator to generate a vertical synchronizing signal and generating the synchronizing signal starting at the position of the leading edge of the vertical synchronizing signal when the input to its reset goes from a high level (hereinafter referred to as an H level) to a low level (hereinafter referred to as an L level), D-type flip-flops (hereinafter referred to as DFFs) 9, 10, 11 and 12, and a monostable multivibrator 13 (hereinafter referred to as a MM). The system further includes an image pickup device 14 including at least an imaging lens system, and a charge storage type solid-state image sensor, e.g., CCD image sensor, for producing a video signal to be applied to the head 3, a driver circuit 15 for driving the image pickup device 14 and a picture signal operating circuit 16 for operating on the p:cture signal from the image pickup device 14. The driver circuit 15 drives the image pickup device 14 in response to the transition of a control signal 202 from the L level to the H level and a picture representative signal generated from the image pickup device 14 for producing a picture signal is sent to the operating circuit 16. In response to the transition of the control signal 202 to the H level, the operating circuit 16 supplies a current to the head 3, thus producing a picture signal to be recorded on the disc 2. The picture signal 101 is subjected to FM modulation for recording on the magnetic disc 2. A recording command signal 103 is generated in response to the closing of a shutter 17. Although not used in this embodiment, an end of exposure signal generated when utilizing the electronic shutter function of the solid-state image sensor corresponds to the signal 103. When the shutter 17 is closed, there is no incident light to the solid-state image sensor and thus the solid-state image sensor functions as a memory in response to the control signal 202 reaching the L level. In the description to follow, a signal generated from the PG 6 is referred to as a PG signal.

Figure 2:
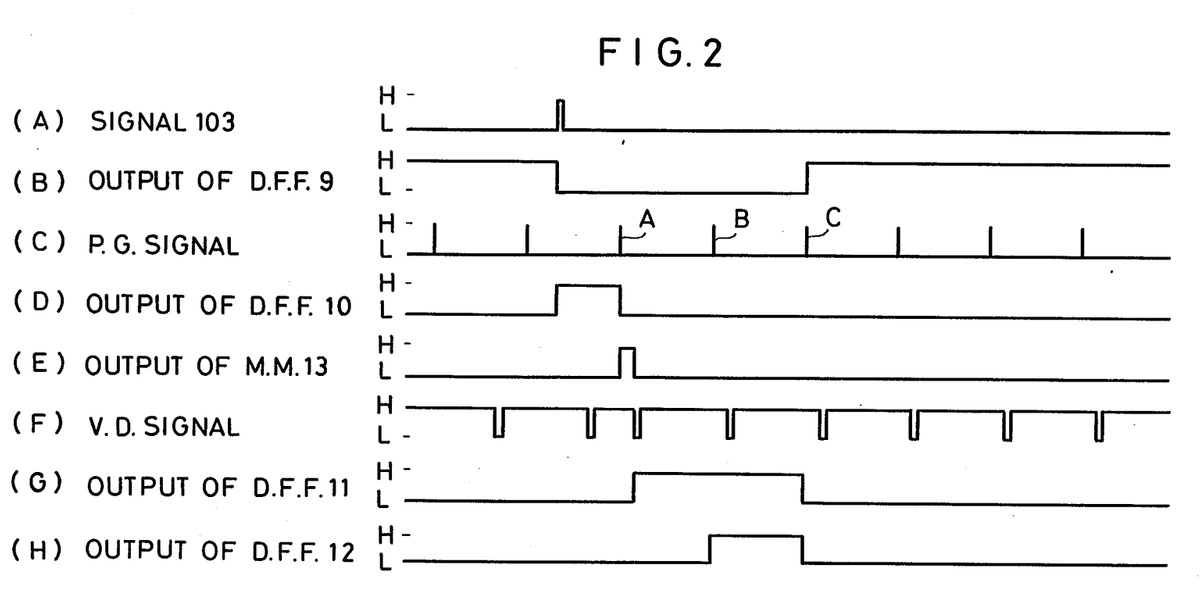
FIG. 2 consisting of (A)–(H) is a time chart for the embodiment shown in FIG. 1.

FIG. 2 is a timing chart for the first embodiment of the invention in which (A) shows the recording command signal 103, (B) the output of the DFF 9, (C) the PG signal, (D) the output of the DFF 10, (E) the output of the MM 13, (F) the vertical synchronizing signal 102 (hereinafter simply referred to as a VD signal), (G) the output of the DFF 11 and (H) the output of the DFF 12.

The operation of the first embodiment of the invention will now be described with reference to FIGS. 1 and 2.

The first embodiment is directed to an electronic still picture camera so designed that a picture signal per field produced by one shooting operation is recorded on an independent endless-type track. The motor 1 is subjected only to the velocity control by the velocity control circuit 7 in accordance with the signals from the FG 5 and the phase control is not effected. As a result, the time required for the rotation velocity of the motor to stabilize after its starting is reduced as compared with that in the case where the phase control is effected. When the photographer depresses the shutter button so that the exposure of the image sensor is completed, a recording command signal 103 is generated as shown in (A) of FIG. 2 so that when the recording command signal 103 goes to the H level, the DFF 9 is reset and the output of the DFF 9 goes to the L level as shown in (B) of FIG. 2. In this case, it is assumed that the rotation velocity of the motor 1 has already reached the lock-in rotation velocity. The output of the DFF 9 is applied to the clock input of the DFF 10 so that when the output of the DFF 9 goes to the L level, the output of the DFF 10 goes to the H level as shown in (D) of FIG. 2. The PG signal shown in (C) of FIG. 2 is applied to the reset input of the DFF 10 so that when the DFF 10 is reset by the first PG signal after the transition of the output of the DFF 10 to the H level or the pulse A shown in (C)

of FIG. 2, the output of the DFF 10 goes to the L level and the trailing edge of the output from the DFF 10 causes the MM 13 to generate a pulse of a predetermined width as shown in (E) of FIG. 2. The pulse width of the output from the MM 13 determines the phase difference between the pulse leading edge of the PG signal and the trailing edge of the VD signal. When the output of the MM 13 reaches the H level, the synchronizing signal generator 8 is reset and the synchronizing signal generator 8 generates a VD signal 102 in response to the trailing edge of the output from the MM 13. Also, the output of the MM 13 is applied to the clock input of the DFF 11 so that the output of the DFF 11 goes to the H level as shown in (G) of FIG. 2 in response to the trailing edge of the output from the MM 13. The output of the DFF 11 is applied to the reset terminal of the DFF 12 and its resetting is released in response to the H level of the output from the DFF 11. The PG signal is applied to the clock input of the DFF 12 so that the output of the DFF 12 goes to the H level in response to the pulse B following the pulse A of the PG signal shown in (C) of FIG. 2 and goes to the L level by the next pulse C. The output of the DFF 12 is applied to the clock input of the DFF 9 so that in response to the trailing edge of the output of the DFF 12, the output of the DFF 9 goes to the H level and the DFF 11 is reset.

When the recording command signal 103 due to the completion of the exposure of the image pickup device 14 is applied to the DFF 9 in the above-mentioned way, the leading edge of the PG signal or the pulse A produces a VD signal with a given phase difference and the control signal 202 goes to the H level during the interval between the leading edge of the next PG signal or the pulse B and the trailing edge of the following PG signal or the pulse C. Thus, a current flows to the head 3 and a picture signal 101 is recorded on the magnetic disc 2 by the magnetic recording head 3. Then, the time interval between the pulses C and B is the time required for one rotation of the disc 2 and it is a very short period of time. Thus, if the velocity control of the magnetic disc 2 is effected with a satisfactory degree of accuracy, the phase difference between the PG signal and the VD signal at the time of the pulses B and C, respectively, will not be varied considerably and this can be considered to be the same with the case where the phase control is effected. Since the present embodiment effects only the velocity control, the rise time at the start of the rotation of the magnetic disc and the recovery time under a disturbing condition can be reduced very greatly as compared with the case where the phase control is effected. In order to reduce the phase difference between the PG signal and the VD signal to zero, it is only necessary to make the H level period of the output from the MM 13 equal to the period of the VD signal.

Then, where the exposure control means comprises a mechanical shutter, vibrations are inevitably caused upon the completion of the exposure and the vibrations are considered to have detrimental effects on the rotation control of the disc and the contact between the magnetic head and the disc sheet. In accordance with the present invention, however, the actual recording takes place after the vibrations have been substantially eliminated and it is possible to avoid the detrimental effects due to the mechanical shutter.

While, in the present embodiment, a picture signal for one field is recorded in an endless manner on one track of a magnetic disc by each shooting operation, it is evident that the starting time and the recovery time of the rotation condition of the disc due to a disturbing torque can be similarly reduced even in a case where a signal for one frame is recorded on one track or two tracks. Also, the recording medium is limited in no way and it is possible to use discs of many different memory materials. Further, the signals to be recorded are not limited to still picture signals and various analog and digital signals can also be recorded.

Figure 3:
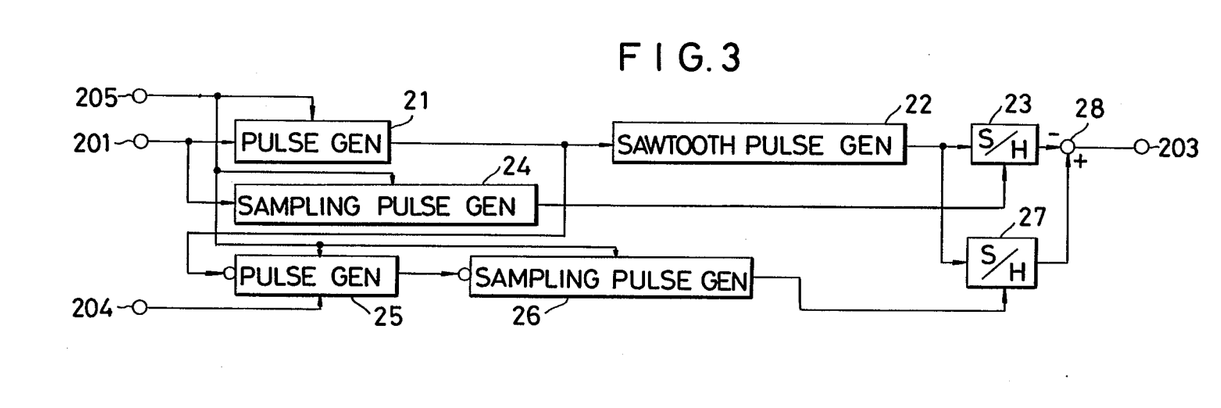
FIG. 3 is a block diagram showing in detail a part of the embodiment of the invention.

FIG. 3 is a block diagram showing the construction of the velocity control circuit 7 in FIG. 1. In the Figure, a pulse generating circuit 21 is a digital circuit comprising a counter and a flip-flop and the circuit is responsive to the leading edge of each pulse signal 201 from the frequency generator FG 5 to count the reference clock signals 205 from the crystal oscillator of FIG. 1 and thereby generate a pulse of a predetermined width $T_1$ which is not varied in pulse width by any temperature changes. A sawtooth pulse generator 22 is responsive to the trailing edge of each pulse generated by the pulse generating circuit 21 to generate a sawtooth pulse. A sample and hold circuit 23 samples and holds and generates the output of the sawtooth pulse generator 22 during the H level of the output of a sampling pulse generator 24, which is responsive to the leading edge of the pulse signal 201 to count the reference clock signals 205 and thereby generate a sampling pulse of a predetermined width.

Another pulse generator 25 is responsive to the trailing edge of each pulse generated from the pulse generator 21 to count the reference clock signals 205 and thereby generate a pulse of a time width $T_2$. Still another pulse generator 26 is responsive to the training edge of each pulse having the pulse width $T_2$ to generate a reference voltage sampling pulse of a predetermined width. Another sample and hold circuit 27 samples and holds and generates the output of the sawtooth pulse generator 22 during the H level of a sampling pulse generated from the sampling pulse generator 26. A feedback voltage 203 or the output of a comparison circuit 28 represents the difference between the output of the sample and hold circuit 23 and the output of the sample and hold circuit 27. A reference voltage setting signal 204 is a preset signal of a counter which controls the pulse width $T_2$ of the pulse generator 25 and the pulse width $T_2$ is set in accordance with the controlled velocity by this digital signal. Then, the sum of the pulse widths $T_1$ and $T_2$ is preset to be equal to the period of the pulse signals 201 in the lock-in condition.

Figure 4:
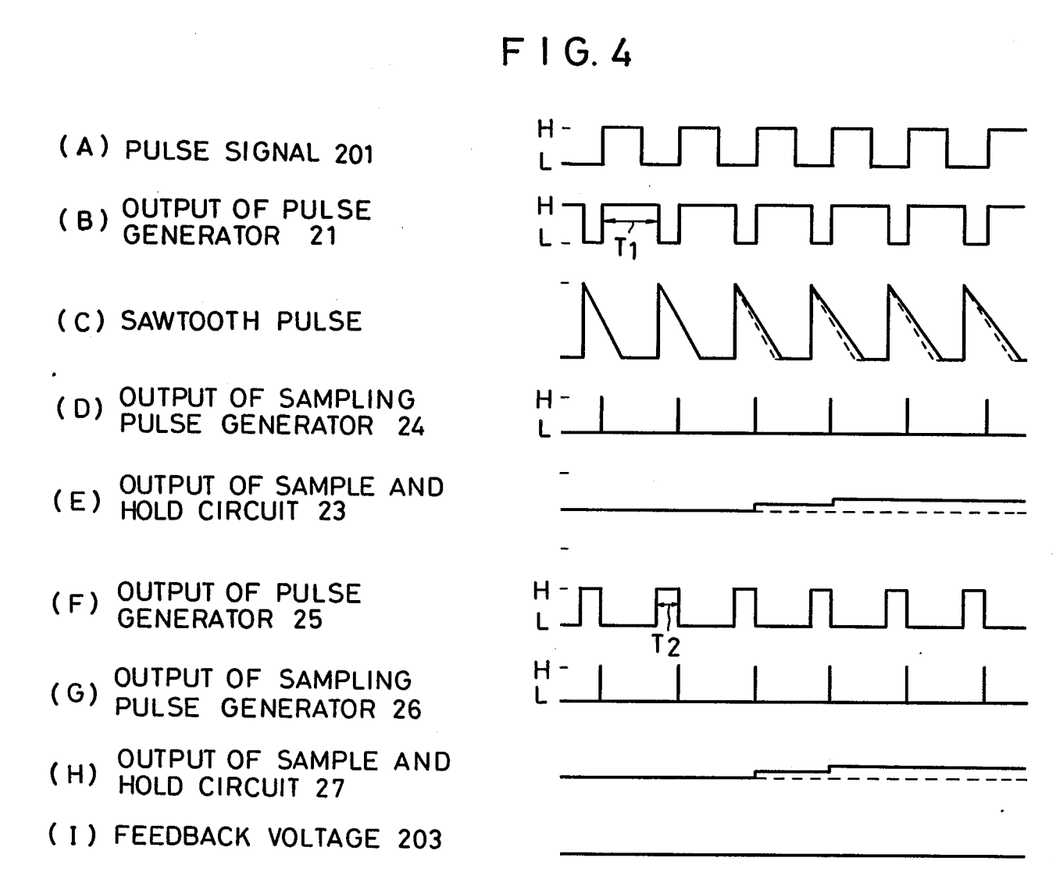
FIG. 4 consisting of (A)–(I) is a time chart for the block diagram of FIG. 3.

FIG. 4 is a time chart for the signals generated in the block diagram of FIG. 3. In the Figure, (A) shows the pulse signal 201 generated from the FG 5, (B) the pulse of the pulse width $T_1$ generated from the pulse generator 21, (C) the sawtooth pulse generated from the sawtooth pulse generator 22, (D) the sampling pulse generated from the sampling pulse generator 24, (E) the output of the sample and hold circuit 23, (F) of the pulse width $T_2$ generated from the pulse generator 25, (G) the reference voltage sampling pulse generated from the sampling pulse generator 26, (H) the reference voltage generated from the sample from the sample and hold circuit 27, and (I) the feedback signal 203. In FIG. 4, the broken lines indicate the case where the temperature is constant and the solid lines indicate the case involving temperature changes.

The operation of the embodiment will now be described with reference to FIGS. 3 and 4.

When the time $T_1$ lapses after the positive-going transition of a pulse signal 201 as shown in (A) of FIG. 4, a sawtooth pulse is generated as shown in (C) of FIG. 4 and the sample and hold circuit 23 samples and holds this output in response to the leading edge of the next pulse signal 201 thereby effecting the frequency-voltage conversion. In this case, if the pulse width $T_1$ and the sampling pulse width of the sample and hold circuit 23 are varied with temperature, the output of the sample and hold circuit 23 is also varied. Thus, in accordance with this embodiment this is prevented by determining the pulse width $T_1$ and the sampling pulse width by counting the reference clock signals 205. On the other hand, the slope of the sawtooth pulse waveform is determined by the sawtooth pulse generator 22 usually by means of a resistor and a capacitor so that the slope is varied with temperature as shown by the solid line in (C) of FIG. 4 and the output of the sample and hold circuit 23 is also varied as shown by the solid line in (E) of FIG. 4. In order to compensate for the variation with temperature of the output from the sample and hold circuit 23, the reference voltage consists of a voltage obtained by sampling the sawtooth pulse by the pulse generator 25, the sampling pulse generator 26 and the sample and hold circuit 27 at the expiration of the time interval $(T_1+T_2)$ after the positive-going transition of the pulse signal 201 as shown in (H) of FIG. 4. As a result, even if the slope of the sawtooth pulse waveform is varied so that the output voltage of the sample and hold circuit 23 is varied as shown in (E) of FIG. 4, the reference voltage is varied correspondingly as shown in (H) of FIG. 4 so that the feedback voltage 203 in (I) of FIG. 4 is not varied with the temperature and the rotation control of the motor is effected without being affected by the temperature. The feedback signal 203 is applied to the motor 1 through an integrator and a power amplifier which are not shown.

This arrangement is also effective in cases where the sawtooth pulse waveform is varied with temperature changes as well as with variations in the power supply voltage.

Also, the phase control may be digitized by counting external clock signals to detect the phase difference between the output signal of the rotational phase signal generator and the phase reference clock signal and thereby varying the given time at which the reference voltage is sampled and held.

As described hereinabove, in accordance with this embodiment the rotation of the motor can be controlled at a constant velocity without being affected by temperature drifts and power supply voltage variations. Also, since the reference voltage can be controlled by digital signals, this embodiment can be used effectively for digitizing a servo circuit.

Figure 5:
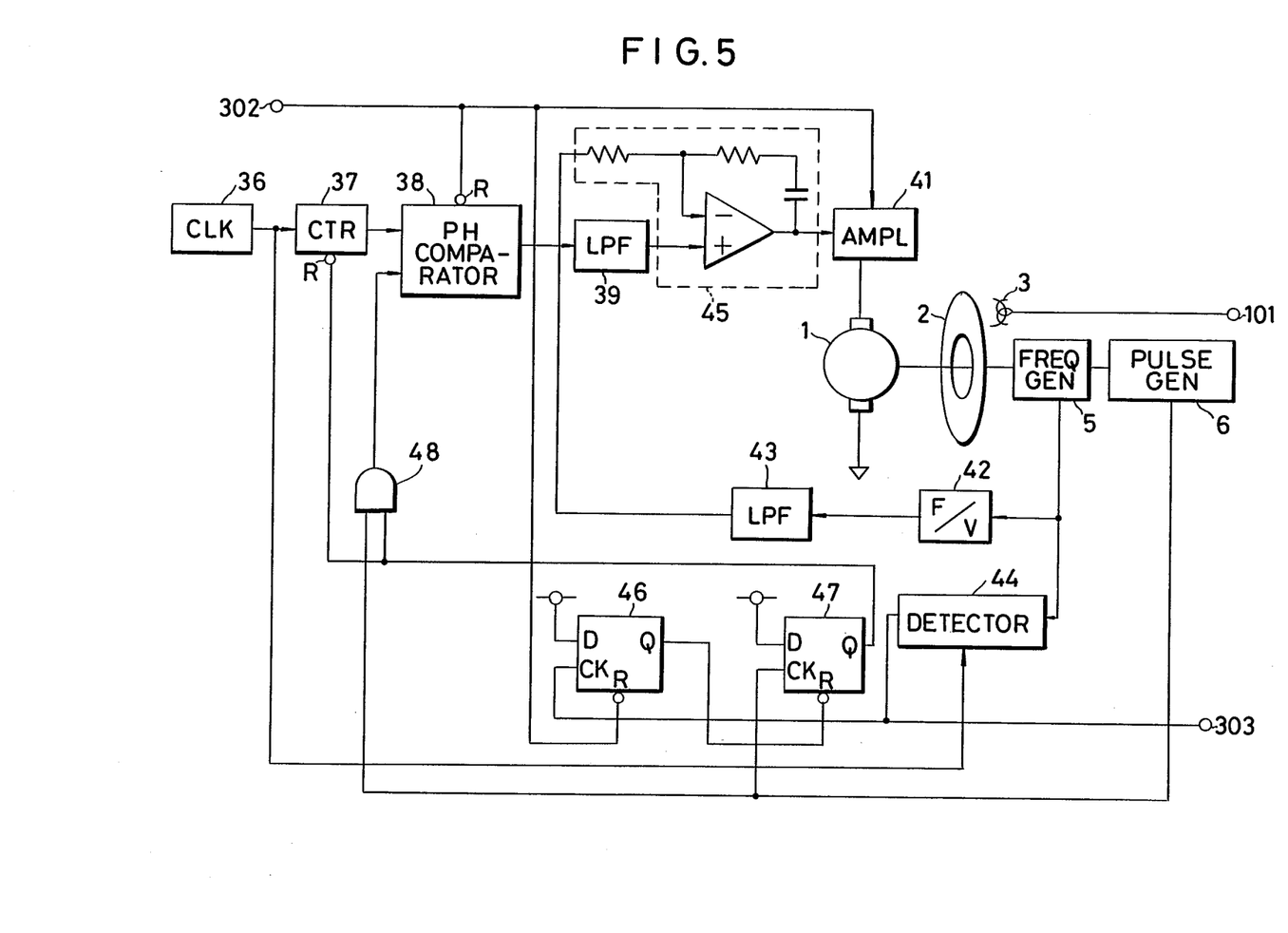
FIG. 5 is a block diagram showing another embodiment of the invention.

FIG. 5 is a block diagram of a disc rotation control system according to another embodiment of the present invention. In the Figure, the same reference numerals as used in FIG. 1 designate the identical or equivalent component parts. A counter 37 divides the frequency of reference clock signals from a reference clock signal generator 36 to generate reference clock signals for motor phase controlling purposes. The reference clock signal generator 36 corresponds to the crystal oscillator of FIG. 1 and the counter 37 corresponds to the synchronizing signal generator 8 of FIG. 1. The reference clock signals are used as synchronizing signals for the picture signal operating circuit system described with reference to FIG. 1. A phase comparator 38 generates a pulse of a pulse width proportional to the phase difference between the reference clock signal and the PG signal, and a low-pass filter 39 receives and converts the pulse generated from the phase comparator 38 to a voltage proportional to the phase difference.

A frequency-voltage converter 42 converts the FG signal to a voltage proportional to the rotation velocity and supplies it to a low pass-filter 43. An integrator 45 is a Type 1 control system in which the difference between the output of the F/V converter 42 and the output of the phase comparator 38 is integrated and fed back to the motor 1 through a power amplifier 41. Thus, even if the load varies, no deviation of the final controlled velocity itself occurs as in the case of the Type O control system. D-type flip-flop DFFs 46 and 47 control the timing of application of the PG signal to the phase comparator 38 through an AND circuit 48

A rotation velocity detecting circuit 44 determines whether the period of the PG signal is within a predetermined time by using the clock signals from the reference clock signal generator 36 as a time base and it generates a signal which goes to the H level when the period is within the predetermined time and goes to the L level in other conditions. Designated at numeral 302 is a start/stop control signal which controls the power amplifier 41 in such a manner that the motor 1 is started when the signal goes to the H level and the motor 1 is stopped when the signal goes to the L level. Designated at numeral 303 is the output of the rotation velocity detecting circuit 44 and this signal effects the display of a warning or the locking of the shutter button when the rotation velocity is disturbed. The counter 37 and the phase comparator 38 both have a reset terminal R.

The output of the counter 37 goes goes to the L level in the reset condition and upon the releasing of the reset condition the output starts appearing in response to the phase of the leading edge of a clock signal from the reference clock signal generator 36. The output of the phase comparator 38 is at an intermediary voltage level in the reset condition.

Figure 6:
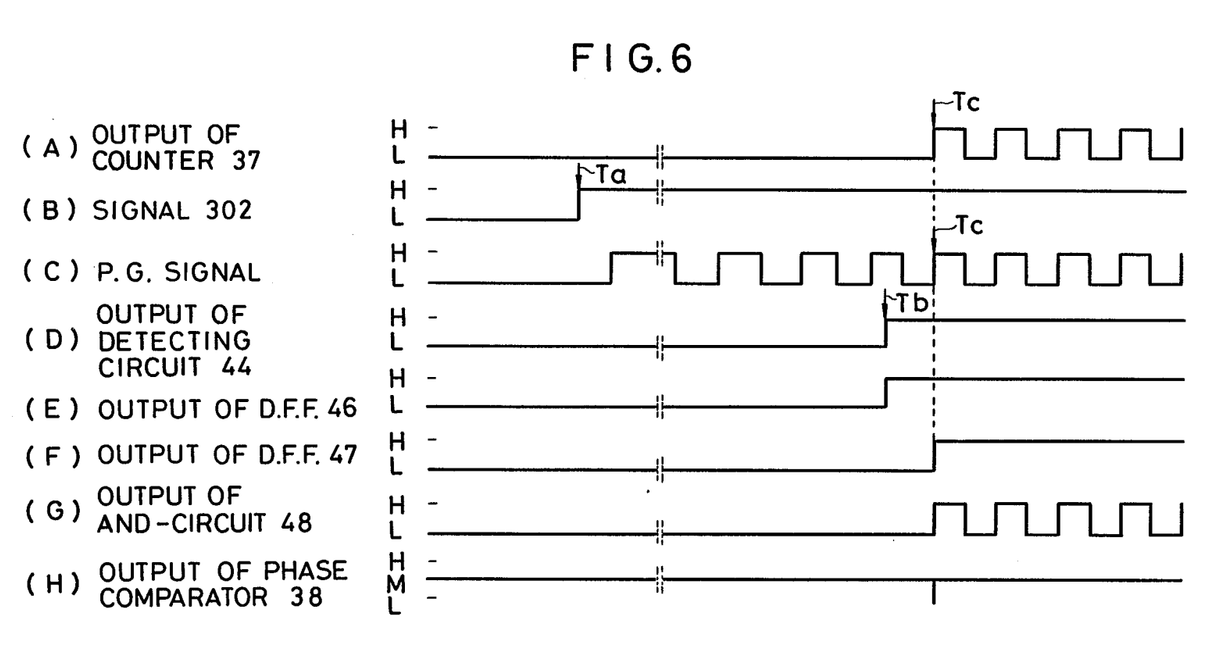
FIG. 6 consisting of (A)–(H) is a time chart for the embodiment showing FIG. 5.

FIG. 6 is a time chart for the starting period of the disc rotation control system according to the embodiment of FIG. 5. In the Figure, (A) shows the output of the counter 37 or the phase controlling reference clock signal, (B) the start/stop control signal 302 for the motor 1, (C) the PG signal or the output of the rotational phase signal generator 6, (D) the output of the rotation velocity detecting circuit 44, (E) the output of the DFF 46, (F) the output of the DFF 47, (G) the output of the AND circuit 48 and (H) the output of the phase comparator 38.

The operation of the second embodiment during the starting will now be described with reference to FIGS. 5 and 6.

When the motor start signal 302 goes to the H level at a time $T_a$ as shown in (B) of FIG. 6, the rotation of the motor 1 is started. While the reset condition of the phase comparator 38 is released at this time, the output of the counter 37 in (A) of FIG. 6 and the output of the AND circuit 48 in (G) of FIG. 6 are both at the L level and therefore the output of the phase comparator 38 is at the intermediary level (M level) as shown in (H) of FIG. 6. The rotation velocity of the motor 1 is controlled in such a manner that the motor 1 is rotated at the same rotation velocity as after the locking-in. When the rotation velocity of the motor 1 attains the same velocity as after the phase lock-in, the output of the rotation velocity detecting circuit 44 detecting this velocity goes to the H level as shown at a time $T_b$ in (D) of FIG. 6. When the output of the rotation velocity detecting circuit 44 goes to the H level, the output of the DFF 46 goes and remains at the H level until the motor start/stop control signal 302 goes to the L level. When the output of the DFF 46 goes to the H level, the reset condition of the DFF 47 is released and the output of the DFF 47 goes to the H level in response to the leading edge of the PG signal in (C) of FIG. 6 as shown at a time $T_c$ in (F) of FIG. 6. When the output of the DFF 49 goes to the H level at the time $T_c$ in (F) of FIG. 6, the reset condition of the counter 37 is released and thus phase controlling reference clock signals are generated in the same phase with the PG signals as shown in (A) and (C) of FIG. 6. Also, the H-level output signal of the DFF 47 is applied to the AND circuit 48 so that the signals of the same phase as the PG signals are generated from the AND circuit 48 as shown in (G) of FIG. 6 and the phase comparator 38 initiates the phase comparison. However, the rotation velocity of the motor 1 has already attained the same velocity as the post phase lock-in velocity and the reference clock signals or the output of the counter 37 are also in phase with the PG signals or the output signals of the AND circuit 48, thus attaining the phase lock-in condition. In other words, in accordance with the present embodiment the lock-in by the phase control can also be attained within the same starting time as that required in the case where only the velocity control is effected.

Also, in the case of a small electronic still picture camera incorporating the above-mentioned magnetic disc type recording system, the occurrence of any irregularity in the rotation of the magnetic disc due to a disturbing torque or the like makes it impossible to properly record a picture signal on the magnetic disc thus causing a distortion in a reproduced picture. Therefore it is necessary to use a rotation variation detecting circuit for detecting any irregular rotation of the magnetic disc so as to give a warning to the photographer or lock the shutter button, for example, and thereby stop the recording operation. On the contrary, in accordance with the present embodiment the rotation velocity detecting circuit 44 concurrently serves as a rotation variation detecting circuit, thereby eliminating the need to provide a separate circuit and simplifying the circuit construction.

Further, while, in the present embodiment, a velocity control loop includes an integrator so as to control the rotation velocity at the same velocity as the post phase lock-in velocity only through the operation of the velocity control loop, the provision of the integrator makes it possible to reduce any controlled velocity deviation due to the load torque to zero only by the velocity control loop and to increase the response speed to variations in the disturbance torque. As a result, a disc rotation control system for electronic still picture cameras should preferably include an integrator as in the case of the present embodiment.

Further, while, the present invention varies the phase of the reference clock signals and therefore it is not suitable for use with computer floppy discs or the like with which the phase of the reference clock signals cannot be varied, the present invention can be used very effectively with apparatus such as an electronic still picture camera in which the phase of the reference clock signals can be varied before the locking-in of the motor rotation without giving rise to any difficulty.

Still further, while in the present invention the velocity control loop is brought into operation immediately after the starting, it is possible to continuously apply the power supply voltage to the motor from the start until a predetermined velocity is exceeded and thereby to further reduce the starting time.

What is claimed is:

1. A system for controlling rotation velocity of a motor comprising:
 (a) first pulse generating means for generating a predetermined number of pulses for every revolution of said motor, the period of the pulses from said means being inversely proportional to the rotation velocity of said motor;
 (b) second pulse generating means for generating a plurality of pulses having a predetermined phase difference with respect to the pulses from said first pulse generating means, each of said pulses from said second pulse generating means having a predetermined period in which the level of said pulses from said second pulse generating means varies linearly;
 (c) first sample and hold means for sampling and holding the pulse from said second pulse generating means in synchronism with the pulse from said first pulse generating means;
 (d) second sample and hold means for sampling and holding the pulse from said second pulse generating means within said predetermined period in synchronism with the pulse from said second pulse generating means; and
 (e) means for controlling the rotation velocity of said motor in accordance with the difference between the value of the pulse from said second pulse generating means sampled and held by said first and second sample and hold means, respectively.

2. A system for controlling rotation velocity of a motor comprising:
 (a) first pulse generating means for generating a predetermined number of pulse for every revolution of said motor, the period of the pulses from said means being inversely proportional to the rotation velocity of said motor;
 (b) second pulse generating means for generating a pulse at the expiration of a first predetermined time after the generation of a pulse from said first pulse generating means, said pulse generated from said second pulse generating means having a predetermined period in which the level of said pulses from said second pulse generating means varies linearly;
 (c) first means for sampling and holding the pulse from said second pulse generating means at the expiration of a second predetermined time after the generation of the pulse from said first pulse generating means;
 (d) second means for sampling and holding the pulse from said second pulse generating means at the expiration of a third predetermined time after the generation of the pulse from said second pulse generating means, said second means sampling and holding the pulse from said second pulse generating means when the same varies linearly, the sum of said first and third predetermined times minus said second predetermined time being substantially equal to the period of the pulse from said first pulse generating means when said motor attains said predetermined rotation velocity; and (e) means for controlling the rotation velocity of said motor in accordance with the difference between the value of the pulses from said second pulse generating means sampled and held by said first and second sample and hold means, respectively.

3. An electronic still picture camera comprising:
(a) image pickup means including a solid-state image sensor for storing charges corresponding to an image of an object to be photographed and a shutter for controlling starting and stopping of the storage of said charges by said solid-state image sensor;
(b) producing means for reading said charges stored by said solid-state image sensor to produce a picture signal indicative of said object;
(c) a disc for storing said picture signal;
(d) a head for recording said picture signal read by said producing means on said disc;
(e) rotating means including a motor for rotating said disc, said rotating means being adapted to control said motor at a predetermined velocity;
(f) means for generating a vertical synchronizing signal;
(g) means for generating at least one pulse for every rotation of said disc in synchronism with the rotation of said disc, said pulse having substantially the same period as the period of said vertical synchronizing signal when said motor attains said predetermined rotation velocity;
(h) shifting means responsive to the stopping of the storage of charges of said solid-state image sensor by said shutter to shift the phase of said vertical synchronizing signal so that a phase difference between said vertical synchronizing signal and said pulse is a predetermined value; and
(i) means for generating a start signal, which causes said producing means to start reading said charges from said solid-state image sensor at the expiration of a predetermined time after said phase shifting of said vertical synchronizing signal by said phase shifting means, said solid-state image sensor holding said stored charges during an interval between the topping of said charge storage by said shutter and the generation of said start signal.

4. A system including a head for recording a picture signal on a track of a disc and a motor for being rotated in such a manner that said head means moves along said track comprising:
(a) producing means for producing a vertical synchronizing signal which has a predetermined period, said head recording said picture signal on said track in synchronism with said vertical synchronizing signal;
(b) means for controlling said motor at a predetermined rotation velocity;
(c) generating means for generting at least one pulse for every rotation of said motor in synchronism with the rotation of said motor, said pulse having substantially the same period as said predetermined period when said motor attains said predetermined rotation velocity; and
(d) shifting means connected with said producing means and said generating means, said shifting means causing said producing means to shift the phase of said vertical synchronizing signal so that a phase difference between said vertical synchronizing signal and said pulse is a predetermined value.

5. A system according to claim 4, which further comprises means for detecting that said shifting means causes said producing means to shift the phase of said vertical synchronizing signal and for producing a detection signal.

6. A system according to claim 5, which further comprises means responsive to said detection signal to cause said head to start recording said picture signal on said track in synchronism with said vertical synchronizing signal.

7. A system including a head for recording a picture signal on a track of a disc and a motor for being rotated so that said head means moves along said track, comprising:
(a) producing means for producing a vertical synchronizing signal which has a predetermined period, said head recording said picture signal on said track in synchronism with said vertical synchronizing signal;
(b) means for controlling said motor at a predetermined rotation velocity;
(c) generating means for generating at least one pulse for every rotation of said motor in synchronism with the rotation of said motor, said pulse having substantially the same period as said predetermined period when said motor attains said predetermined rotation velocity;
(d) detecting means for detecting that said motor has attained said predetermined rotation velocity and thereby generating a detection signal; and
(e) adjusting means responsive to said detection signal to adjust the timing of generation of said vertical synchronizing signal.

8. A system according to claim 7, wherein said adjusting means adjust the timing of generation of said vertical synchronizing signal so that a phase difference between said vertical synchronizing signal and said pulse is a predetermined value.

9. A system including a head for recording a picture signal on a track of a disc and a motor for rotating said disc, comprising:
(a) producing means for producing a vertical synchronizing signal of said picture signal, said vertical synchronizing signal having a predetermined period;
(b) controlling means for controlling said motor at a predetermined rotation velocity;
(c) pulse generating means for detecting the rotation of said disc by said motor and generating at least one pulse for every rotation of said disc, said pulse having substantially the same period as said predetermined period when said motor attains said predetermined rotation velocity; and
(d) shifting means connected with said producing means and said pulse generating means, said shifting means causing said producing means to shift the phase of said vertical synchronizing signal so that a phase difference between said vertical synchronizing signal and said pulse is a predetermined value.

10. A system according to claim 9, which further comprises means for detecting that said shifting means causes said producing means to shift the phase of said vertical synchronizing signal and for producing a detection signal.

11. A system according to claim 10, which further comprises means responsive to said detection signal to cause said head to start recording said picture signal on said track.

12. A system according to claim 9, wherein said controlling means controls said motor after shifting the phase of said vertical synchronizing signal by said shifting means, so that a phase difference between said vertical synchronizing signal and said pulse is a predetermined value.

13. A system including a head for recording a picture signal on a track of a disc and a motor for rotating said disc, comprising:
   (a) vertical synchronizing signal generating means for generating a vertical synchronizing signal of said picture signal, said vertical synchronizing signal having a predetermined period;
   (b) controlling means for controlling said motor at a predetermined rotation velocity;
   (c) pulse generating means for detecting the rotation of said disc by said motor and generating at least one pulse for every rotation of said motor, said pulse having substantially the same period as said predetermined period when said motor attains said predetermined rotation velocity;
   (d) detecting means for detecting that said motor has attained said predetermined rotation velocity and thereby generating a detection signal; and
   (e) adjusting means responsive to said detection signal to adjust the timing of generation of said vertical synchronizing signal.

14. A system according to claim 13, wherein said adjusting means adjust the timing of generation of said vertical synchronizing signal so that a phase difference between said vertical synchronizing signal and said pulse is a predetermined value.

15. A system according to claim 13, wherein said controlling means controls said motor after adjusting the timing of generation of said vertical synchronizing signal by said adjusting means, so that a phase difference between said vertical synchronizing signal and said pulse is a predetermined value.

16. An electronic still picture camera comprising:
   (a) image pickup means including a solid-state image sensor for storing charges corresponding to an image of an object to be photographed and shutter means for controlling starting and stopping of the exposure of said solid-state image sensor by the image of the object;
   (b) producing means for reading said charges stored by said solid-state image sensor to produce a picture signal indicative of the image of the object;
   (c) rotating means including a motor for rotating a disc on which said picture signal is recorded, said rotating means being adapted to control said motor at a predetermined velocity;
   (d) a head for recording said picture signal read by said producing means on said disc;
   (e) means for generating a vertical synchronizing signal;
   (f) means for generating at least one pulse for every rotation of said disc in synchronism with the rotation of said disc, said pulse having substantially the same period as the period of said vertical synchronizing signal when said motor attains said predetermined velocity.
   (g) shifting means responsive to the stopping of the exposure of said solid-state image sensor by said shutter means to shift the phase of said vertical synchronizing signal so that a phase difference between said vertical synchronizing signal and said pulse is a predetermined value; and
   (h) starting means for generating a start signal, which causes said producing means to start reading said charges from said solid-state image sensor at expiration of a predetermined period of time after said phase shifting of said vertical synchronizing signal by said shift means, said solid-state image sensor holding said stored charges during an interval between the stopping of the exposure of said solid-state image sensor by said shutter means and the generation of said start signal.

17. An electronic still picture camera according to claim 16, wherein said starting means generates said starting signal in response to said pulse.

* * * * *